United States Patent
Takahashi et al.

(10) Patent No.: US 8,154,531 B2
(45) Date of Patent: Apr. 10, 2012

(54) TOUCH PANEL

(75) Inventors: Hirohisa Takahashi, Sammu (JP); Satoru Ishibashi, Sammu (JP); Noriaki Tani, Sammu (JP); Sadayuki Ukishima, Sammu (JP); Satoru Takasawa, Sammu (JP); Kyuzo Nakamura, Chigasaki (JP); Haruhiko Yamamoto, Chigasaki (JP)

(73) Assignee: ULVAC, Inc., Chigasaki-shi (JP)

( * ) Notice: Subject to any disclaimer, the term of this patent is extended or adjusted under 35 U.S.C. 154(b) by 0 days.

(21) Appl. No.: 13/137,212

(22) Filed: Jul. 28, 2011

(65) Prior Publication Data

US 2011/0298738 A1 Dec. 8, 2011

Related U.S. Application Data

(60) Division of application No. 12/814,039, filed on Jun. 11, 2010, now Pat. No. 8,031,183, which is a continuation of application No. PCT/JP2008/072033, filed on Dec. 4, 2008.

(30) Foreign Application Priority Data

Dec. 14, 2007 (JP) ................................ 2007-323491

(51) Int. Cl.
G06F 3/041 (2006.01)

(52) U.S. Cl. ....................................... 345/173; 345/156

(58) Field of Classification Search .................. 345/156, 345/173–177, 104; 178/18.01–18.09, 19.01–19.03; 445/24; 29/592
See application file for complete search history.

(56) References Cited

U.S. PATENT DOCUMENTS

| 7,060,320 B1 | 6/2006 | Omote et al. ................. 427/108 |
| 2004/0246238 A1 | 12/2004 | Oya .............................. 345/173 |

FOREIGN PATENT DOCUMENTS

| JP | 63/53135 | 4/1988 |
| JP | 03-172913 | 7/1991 |
| JP | 2000-081952 | 3/2000 |
| JP | 2007-141853 | 6/2007 |
| JP | 2007-188707 | 7/2007 |

OTHER PUBLICATIONS

International Search Report for International Application No. PCT/JP2008/072033 dated Feb. 25, 2009.

*Primary Examiner* — Ricardo L Osorio

(74) *Attorney, Agent, or Firm* — Kratz, Quintos & Hanson, LLP

(57) ABSTRACT

A touch panel having high durability is provided. Either one or both of a display device and a flexible panel have island-shaped protective bodies formed on surfaces of electrode layers (upper electrode layer, lower electrode layer), and a transparent conductive film is exposed between the protective bodies. Since the protective bodies protrude highly from the surface of the transparent conductive film, when the flexible panel is pressed and the upper electrode and the lower electrode layer are brought into contact, a load to be applied to the transparent conductive film is reduced by the protective bodies, so that the transparent conductive film is not broken.

6 Claims, 16 Drawing Sheets

TOUCH PANEL

This application is a division of U.S. application Ser. No. 12/814,039, filed Jun. 11, 2010 now U.S. Pat. No. 8,031,183, which application is a continuation application of International Application No. PCT/JP2008/072033, filed Dec. 4, 2008, which claims priority to Japan Patent Application No. 2007-323491, filed Dec. 14, 2007. The entire disclosures of the prior applications are herein incorporated by reference in their entireties.

BACKGROUND OF INVENTION

The present invention generally relates to a technical field of touch panels.

Touch panels have been widely used in an ATM, a vending machine, a handheld terminal, a handheld game device, an electronic guide display plate, a car navigation, a cell phone, or the like.

The touch panel is generally formed by bonding two panels together, on the surfaces of which transparent electrode films (such as, an ITO thin film) is formed with these transparent electrode films facing each other. At least one of the two panels has flexibility; and when the flexible panel is pressed, the transparent electrode films are brought into conduction at a pressed location. Such a touch panel includes the so-called matrix touch panel and the so-called resistive touch panel.

In either of the touch panels, the transparent electrode films are brought into conduction by being directly or indirectly contacted to each other, so that when the same location is repeatedly pressed, the transparent electrode film may be clouded or cracked due to the friction. There is a need to address this problem particularly with the transparent electrode of a panel on the side pressed by the flexible panel. See JP-A 2000-081952.

SUMMARY OF THE INVENTION

The present invention provides a highly durable touch panel.

The present invention is directed to a touch panel in which first and second panels have first and second substrates and first and second transparent electrodes respectively disposed on the corresponding first and second substrates, the first and second panels being separately arranged in a state such that faces having the first and second transparent electrodes disposed thereon are facing toward each other, and the first and second transparent electrodes are brought into contact when either one or both of the first and second panels are pressed, wherein the first transparent electrode comprises a transparent conductive film and protective bodies which are formed in a piled-up fashion on a surface of the transparent conductive film and scattered in the form of islands on the surface of the transparent conductive film, wherein a protecting film containing either one or both of a nitride of a metallic material and an oxide of the metallic material is exposed on surfaces of the protective bodies.

The present invention is directed to the touch panel, wherein the metallic material comprises any one or more kinds of metals selected from a metal group consisting of Ti, Nb, Zr, Ta and Si, and the transparent conductive film has a lower resistance than the protecting film.

The present invention is directed to a method for producing a touch panel, which includes forming a first transparent electrode on a surface of a first substrate to prepare a first panel, and bonding together the first panel and a second panel having a second transparent electrode formed on a surface of a second substrate such that the first and second transparent electrodes are facing toward each other, wherein the first transparent electrode forming step comprises forming a transparent conductive film composed mainly of a transparent oxide on a surface of the first substrate, forming plural metallic flocculated bodies on a surface of the transparent conductive film by depositing any one or more kinds of metals selected from a metal group consisting of Ti, Nb, Zr, Ta and Si, and forming a protecting film by performing either one or both of an oxidation reaction to oxidize the metallic flocculated bodies and a nitriding reaction to nitride the metallic flocculated bodies.

The present invention is directed to the method for producing the touch panel, wherein a step for forming the metallic flocculated bodies and a step for forming the protecting film are alternatively and repeatedly carried out.

The present invention is constructed as described above. Since the protective bodies highly protrude from the transparent conductive film, when the first and second transparent electrodes are to be brought into contact, the second transparent electrode contacts the protective bodies first, and then contacts the transparent conductive film. Since a load to be applied to the transparent conductive film is reduced by the protective bodies, the transparent conductive film is less likely to be abraded.

In the case where the protective bodies and the transparent conductive film are made of the same material, the protective bodies are planarized every time the transparent electrode is repeatedly pressed, so that the surface of the transparent electrode finally becomes flat, and the abrasion resistance decreases.

In the present invention, the transparent conductive film is made of the transparent oxide such as ITO or AZO and at least surface portions of the protective bodies (the protecting film) are constituted by the oxide and/or the nitride different from the transparent oxide constituting the transparent conductive film, so that the mechanical strength of the protective bodies is higher than that of the transparent conductive film. Thus, even when the protective bodies are repeatedly pressed, the surface of the first transparent electrode does not become flat, and the transparent conductive film is protected.

A part of the protective bodies may be made of a metal alone. However, since the metal alone has a weaker mechanical strength when compared with an oxide or a nitride of that metal, it is desirable to have at least the surfaces of the protective bodies constituted by the metal oxide and/or the metal nitride.

EFFECTS OF THE INVENTION

Since the first transparent electrode has not only excellent transparency but also high abrasion resistance, it is not cracked or clouded even when being repeatedly pressed, so that the lifetime of the touch panel is prolonged. Further, while a film of the protective bodies is formed, a surface of a metal target is not oxidized or nitrided and the sputtering speed does not decrease, so that the film-forming speed of the protective bodies is high. Furthermore, since the substrate does not reach a high temperature, a highly flexible plastic substrate can be used.

DETAILED DESCRIPTION OF THE INVENTION

Figure 1:
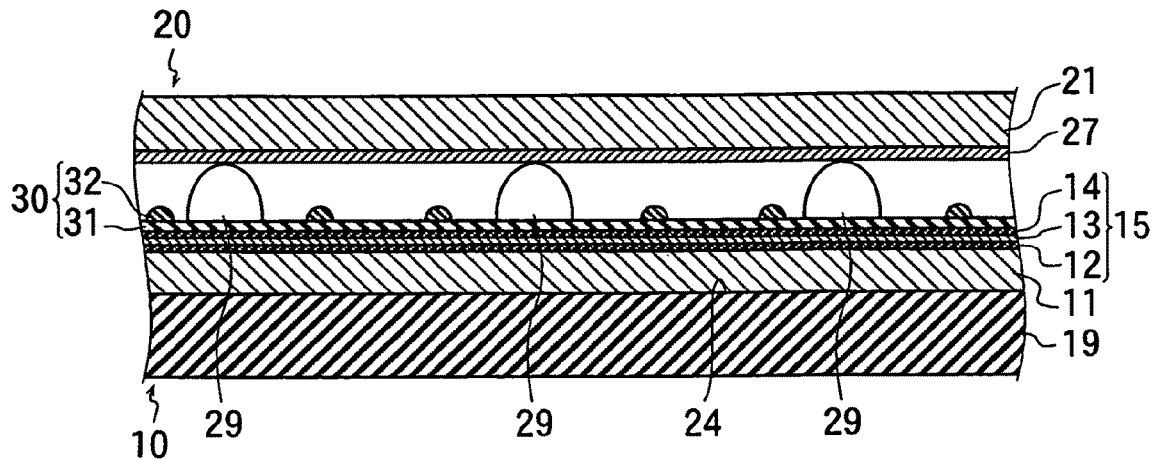
FIG. 1 is a sectional view for illustrating a touch panel of a first embodiment.

Reference numeral 1 of FIG. 1 represents an example of a touch panel; and the touch panel 1 includes a display device 10 (first panel) and a flexible panel 20 (second panel).

The display device 10 includes a plate-like display panel 19 such as an LCD (liquid crystal display) device or a PDP (plasma display panel). Either one of a front surface and a rear surface of the display panel 19 is used as a display surface 24 so that image information (such as, graphics or letters) may be displayed on the display surface 24.

Here, the display device 10 includes, in addition to the display panel 19, a transparent substrate 11 (first substrate) disposed on the display surface 24, an antireflection layer 15 disposed on a surface of the substrate 11, and a lower electrode layer 30 (first transparent electrode) disposed on a surface of the antireflection layer 15. However, it may be that the substrate 11 is constituted by a part of the display panel 19 and the display surface 24 is constituted by a surface on a side of the substrate 11 upon which the antireflection layer 15 is laminated. Further, the lower electrode layer 30 may be formed directly on the surface of the substrate 11 without providing the antireflection layer 15.

A plurality of spacers 29 is disposed at an interval on a surface of the lower electrode layer 30.

The flexible panel 20 includes a flexible film 21 (second substrate) such as a resin film, and an upper electrode layer 27 (second transparent electrode) formed on a surface of the flexible film 21. The flexible panel 20 is mounted on the spacers 29 in a state such that the surface having the upper electrode layer 27 formed thereon is facing toward the lower electrode layer 30. Therefore, the upper electrode layer 27 and the lower electrode layer 30 are spaced apart by the height of the spacer 29.

Each of the flexible film 21, the upper electrode layer 27, the lower electrode layer 30, the antireflection layer 15 and the substrate 11 is transparent, so that image information displayed on the display surface 24 can be observed from the flexible panel 20 side.

The antireflection layer 15 is constituted by laminating plural layers (here, three layers) of transparent films 12 to 14 each having a different refractive index.

When an outside light, such as sunlight or an illumination light, which passes the flexible panel 20 and is reflected at a surface of the lower electrode layer 30, is taken as a surface reflected light, the refractive index and the film thickness of each of the transparent films 12 to 14 are designed so that phases of interface reflection lights reflected on the respective surfaces of the transparent films 12 to 14 are deviated from the surface reflected light; and thus, the surface reflected light may be attenuated by the interface reflection lights. Therefore, an image displayed on the display panel 19 of the present invention can be clearly observed.

The quality of the material and the film thickness of the upper electrode layer 27 allow upper electrode layer 27 to be deformable together with the flexible film 21. When the flexible panel 20 is depressed and the flexible film 21 is bent, the upper electrode layer 27 is deformed together with the flexible film 21, so that the entire flexible panel 20 can be deformed.

A user of the touch panel 1 observes the image information of the display panel 19, selects a position based on that image information, and presses the flexible panel 20 at the selected position. The pressed position of the flexible panel 20 is curved, and the upper electrode layer 27 approaches the lower electrode layer 30 at the pressed position.

The lower electrode layer 30 includes a transparent electrode film 31 disposed on a surface of the substrate 11, and protective bodies 32 scattered on a surface of the transparent electrode film 31. Because the protective bodies 32 are piled up on the surface of the transparent conductive film 31 in the form of an island, when the upper electrode layer 27 approaches the lower electrode layer 30 due to pressing, the surface of the upper electrode layer 27 is in contact with the protective bodies 32.

The surface of the transparent conductive film 31 is exposed between the protective bodies 32. The thickness of the protective body 32 is as small as less than 2.5 nm (target value when the film is formed), and the size (diameter) of the planar shape of the protective body 32 is as small as 30 Å or more to 1000 Å or less (3 nm or more to 100 nm or less), so that the upper electrode layer 27 is in contact with the surface of the transparent conductive film 31 exposed between the protective bodies 32 due to pressing.

At least a surface portion (protecting film) of the protective body 32 is composed mainly of either one or both of an oxide of a metallic material of Ti and/or Nb and a nitride of the metallic material thereof. That is, the protecting film is composed mainly of one or more kinds of reaction products selected from the group consisting of an Nb oxide, a Ti oxide, an Nb nitride and a Ti nitride.

The transparent conductive film 31 is composed mainly of a material having a resistance lower than the main component of the above-mentioned protecting film, such as ITO or AZO. When the upper electrode layer 27 comes into contact with the surface of the transparent conductive film 31, the upper electrode layer 27 and the lower electrode layer 30 are electrically connected.

The upper electrode layer 27 and the lower electrode layer 30 are respectively connected to an analyzer. When the touch panel 1 utilizes the resistance film system, the pressed position is known from a voltage value of a magnitude corresponding to a pressed position. When the touch panel 1 utilizes the matrix system, the pressed position is known from the position of a wiring electrically conducting due to pressing.

The surface portion of the protective body 32 has a mechanical strength higher than that of the transparent conductive film 31, and the protective body 32 is not damaged even when the first transparent electrode 30 is repeatedly pressed. In addition, since the protective body 32 protrudes highly from the surface of the transparent conductive film 31, when the first transparent electrode 30 is pressed, a load to be applied to the transparent conductive film 31 is reduced by the protective bodies 32. Therefore, the transparent conductive film 31 is not damaged much; and thus, the first transparent electrode 30 is not clouded or cracked.

Figure 2:
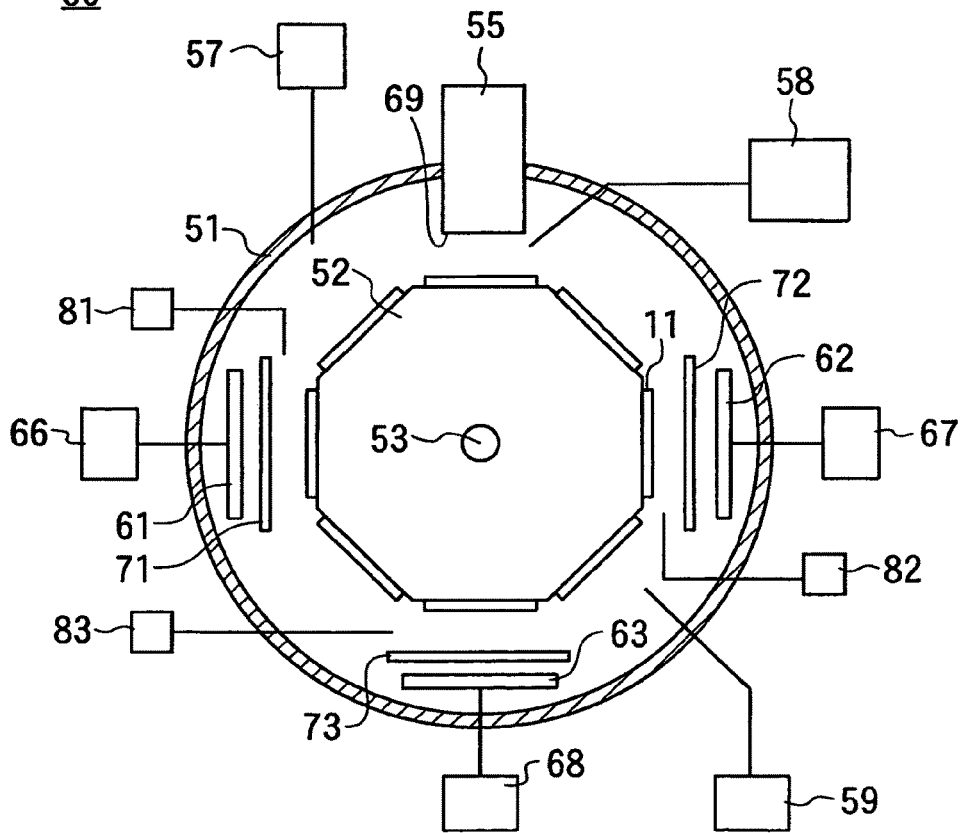
FIG. 2 is a sectional view for illustrating a film forming apparatus to be used in the present invention.

Next, a film forming apparatus to be used for producing the first panel will be explained. Reference numeral 50 in FIG. 2 shows one embodiment of the film forming apparatus.

This film forming apparatus 50 includes a vacuum chamber 51, a rotary shaft 53, a metal target 61, an inorganic target 62, a transparent conductive material target 63 and an ion gun 55.

The rotary shaft 53 is arranged inside the vacuum chamber 51, and a rotary body 52 is fixed around the rotary shaft 53. The rotary shaft 53 is connected to a non-illustrated rotating means. When a power is transmitted from the rotating means, the rotary shaft 53 rotates around a central axis (rotary axis) passing through the center of the rotary shaft 53, and the rotary body 52 rotates around the same rotary axis together with the rotary shaft 53 inside the vacuum chamber 51.

A holding device not shown is provided at a side face of the rotary body 52. Substrates to be held are held at the holding device. The substrates to be held are fixed to the rotary body 52 in a state such that film-forming surfaces are facing toward a side opposite to the rotary axis and set in parallel to the rotary axis. When the rotary shaft 53 rotates, the substrates to be held rotate around the rotary axis all together with the rotary body 52.

An ion gun 55 is disposed such that at least a portion thereof provided with a discharge opening 69 is located inside the vacuum chamber 51 in a state such that the discharge opening 69 is facing toward the side face of the rotary body 52.

A sputtering gas introduction system 59 is connected to the vacuum chamber 51, and a rare gas is introduced into the ion gun 55 from the sputtering gas introduction system 59 or another introduction system. The ion gun 55 plasmatizes the introduced rare gas, and the plasmatized rare gas is taken out through the discharge opening 69 and discharged toward the side face of the rotary body 52 as an ion beam.

The metal target 61, the inorganic target 62 and the transparent conductive material target 63 are respectively disposed in the same vacuum chamber 51 as the vacuum chamber 51 in which the discharge opening 69 is located, at locations which are outside a circumference in which the substrate to be held rotationally moves and which are along that circumference.

The heights of the discharge opening 69, the metal target 61, the inorganic target 62 and the transparent conductive material target 63 are almost equal to a height at which the substrates to be held are held by the holding device. When the substrates to be held move rotationally, they pass a position facing toward the discharge opening 69, a position facing toward the metal target 61, a position facing toward the inorganic target 62 and a position facing toward the transparent conductive material target 63.

The sputtering gas introduction system 59 is designed so as to feed a sputtering gas into a space between each of the targets 61 to 63 and the side face of the rotary body 52. Power sources 66 to 68 are connected to the respective targets 61 to 63.

A vacuum evacuation system 57 is connected to the vacuum chamber 51, the vacuum chamber 51 is evacuated to vacuum by the vacuum evacuation system 57, and voltages are applied to the targets 61 to 63 from power sources 66 to 68 in a state such that the vacuum chamber 51 is set at a ground potential, while the sputtering gas (Ar, Kr or the like) is being introduced from the sputtering gas introduction system 59. Consequently, the targets 61 to 63 are sputtered, and particles (sputtered particles) of constituent materials of the targets 61 to 63 are discharged toward the side face of the rotary body 52.

Thus, when the substrates to be held pass the positions facing toward the targets 61 to 63, the particles of the constituent material of each of the targets 61 to 63 reach surfaces of the substrates to be held.

A reactive gas feeding system 58 is attached to the vacuum chamber 51 so that the reactive gas may be fed into a space between the discharge opening 69 and the side face of the rotary body 52.

When the ion beam is discharged through the discharge opening 69 with the reactive gas being fed, the reactive gas is plasmatized. When the substrate to be held passes the position facing toward the discharge opening 69, it is exposed to the plasma of the reactive gas.

In the case where the targets 61 to 63 are sputtered and the rotary body 52 is rotated with the reactive gas being plasmatized, when the substrate to be held passes the positions facing toward the targets 61 to 63, the sputtered particles reach the surface of the substrate to be held and atomic layers are formed on the surface of the substrate to be held; and when the substrate to be held passes the position facing toward the discharge opening 69, the plasmatized reactive gas and the atomic layer react and a layer of a reaction product can be formed.

This method is known as "metal mode"; the reactive gas is fed directly between the discharge opening 69 and the rotary body 52, and the atomic layer can be reacted with the reactive gas without feeding a large amount of the reactive gas into the vacuum chamber 51.

Therefore, even if the reactive gas can be reacted with the targets 61 to 63, the partial pressure of the reactive gas within the vacuum chamber 51 can be suppressed to such a low level that the reaction product between the reactive gas and the targets may not be formed on the surfaces of the targets 61 to 63.

If a background pressure level in the vacuum chamber 51 is unsatisfactory, the reaction product of the reactive gas, such as a nitride or an oxide, may be formed on the surfaces of the targets 61 to 63 even in the metal mode.

In order to help prevent the formation of the reaction product on the surfaces of the targets 61 to 63, a reducing gas (reducing agent) is fed from reducing gas introduction systems 81 to 83 into the vacuum atmosphere (inside the vacuum chamber 51) in which the targets 61 to 63 are placed.

The surfaces of the targets 61 to 63 are exposed to the reducing gas, and the targets 61 to 63 are sputtered in the vacuum atmosphere containing the reducing gas.

Even if the plasma of the reactive gas turns around the vicinity of the targets 61 to 63, no reaction product is formed on the surfaces of the targets 61 to 63 because the plasma is reduced through a reaction with the reducing gas.

Either one or both of a hydrogen gas ($H_2$) and a gas containing a hydrogen atom in a chemical structure can be used as the reducing gas. As the gas containing the hydrogen atom in the chemical structure, methane ($CH_4$), an ethane gas ($C_2H_6$) and the like are recited, for example.

A gas (a rare gas, for example) to be fed into the ion gun 55 is the same gas as the above-described sputtering gas or a gas which does not react with the constituent material of each of the targets 61 to 63.

In this way, the surfaces of the targets 61 to 63 do not react with any of the gases, so that the sputtering speed does not drop due to the formation of the reaction product with the reactive gas on the surfaces of the targets as in another reactive sputtering method.

Next, steps of producing the first panel by using this film forming apparatus 50 will be explained.

The inside of the vacuum chamber 51 is evacuated to vacuum by the vacuum evacuation system 57; a vacuum atmosphere is formed at a predetermined pressure; one or more substrates 11 (first substrates) as substrates to be held are carried into the vacuum chamber 51, while the vacuum atmosphere is being kept; and each of the substrates 11 is held by the holding device and attached to the rotary body 52.

While the vacuum chamber 51 is continuously evacuated to vacuum and the rotary body 52 is being rotated, the inorganic target 62 (Si target, for example) is sputtered, and the reactive gas ($O_2$, for example) is plasmatized.

When the substrate 11 passes the position facing toward the inorganic target 62, the sputtered particles discharged from the inorganic target 62 reach the surface thereof and an atomic layer (Si layer) is formed; when the substrate passes the position facing toward the discharge opening 69, the atomic layer reacts with the plasmatized reactive gas and a transparent film 12 made of a transparent insulating material ($SiO_2$) is formed.

If the rotary body 52 is rotated while the sputtering of the inorganic target 62 and the plasmatization of the reactive gas are continuing, the formation of the atomic layer and the reaction with the reactive gas are repeatedly performed, so that the film thickness of the transparent film 12 becomes greater and the surface of the substrate 11 is covered with the transparent film 12.

When a first layer which is the transparent film 12 reaches a predetermined film thickness, the sputtering of the inorganic target 62 is stopped, and another inorganic target (the metal target 61, here) is sputtered while the rotation of rotary body 52 and the plasmatization of the reactive gas are continuing. A second layer which is a transparent film 13 (NbO film, here) having a different refractive index from that of the first layer is formed in such a manner that the entire surface of the first layer which is the transparent film 12 is covered with the transparent film 13.

When the second layer which is the transparent film 13 reaches a predetermined film thickness, the sputtering is stopped, a third layer which is a transparent film 14 ($SiO_2$ film, here) having a refractive index different from that of the second layer is formed by sputtering the inorganic target 62, different from the target 61 used in the forming of the second layer, in such a manner that the surface of the second layer which is the transparent film 13 is covered with the transparent film 14, thereby forming an antireflective layer 15.

In this connection, so long as the transparent films 12 to 14 each having the different refractive indexes are laminated for the antireflective layer 15, the kinds and the order of the targets to be sputtered and the number of the transparent films 12 to 14 are not particularly limited.

After the antireflective film 15 is formed, the plasmatization of the reactive gas and the sputtering of the inorganic target 62 are stopped, the transparent conductive material target 63 is sputtered while the introduction of the sputtering gas and the rotation of the rotary body 52 are continuing, and a transparent conductive film 31 made of the transparent conductive material is formed in such a manner that the surface of the antireflective layer 15 is covered with the transparent conductive film 31. In this case, when the transparent conductive film 31 is to be formed, oxygen is introduced into the vacuum chamber 51, if necessary, so as to compensate for oxygen loss.

When the transparent conductive film 31 grows to a predetermined film thickness, the sputtering of the transparent conductive material target 63 is stopped.

While the vacuum chamber 51 is continuously evacuated to vacuum, the reactive gas (oxidizing gas and/or nitriding gas) is fed to such a level that a product caused by the reactive gas may not be formed on the surface of the metal target 61, the reactive gas is plasmatized, and the rotary body 52 is rotated with the metal target 61 containing either one or both of Ti and Nb being sputtered.

Since no reaction product is produced on the surface of the metal target 61, metal particles (Ti and/or Nb) are discharged from the metal target 61 as the sputtering particles, and when the substrate 11 passes the position facing toward the metal target 61, the metal particles reach the surface of the transparent conductive film 31.

Since the metal which is not oxidized or nitrided has a high cohesive property, the metal particles flocculate and are piled up on the transparent conductive film 31, thereby forming a metal atomic layer (metal flocculated bodies).

The rotating speed of the rotary body 52, that is, the moving speed of the substrate 11, is so high that the entire surface of the transparent conductive film 31 is not covered with the metal atomic layer, and the metal atomic layers are formed in a scattered fashion when the substrate 11 once passes the position facing toward the metal target 61. Therefore, the transparent conductive film 31 is exposed between the metal atomic layers.

When the substrate 11 passes the position facing toward the discharge opening 69, the metal atoms constituting the metal atomic layer react with the plasmatized reactive gas.

Since the metal atomic layer is constituted by several metal atoms which are piled upon one another, when the substrate 11 once passes the position facing toward the discharge opening 69, all the metal atoms constituting the metal atomic layer react with the reactive gas, whereby a protective body 32 made of the reaction product is formed.

Note that the reaction product is a metal nitride in the case of the reactive gas being a nitriding gas, a metal oxide in the case of the reactive gas being a oxidizing gas, and a mixture of the metal oxide and the metal nitride in the case of the reactive gas being a mixture of the nitriding gas and the oxidizing gas.

While the sputtering of the metal target 61 and the plasmatization of the reactive gas continue, the rotary body 52 is continuously rotated, and the formation of the metal atomic layer and the production of the reaction product are alternatively and repeatedly performed, so that the film thickness and the plane shape of each of the productive bodies 32 become larger.

When the diameter of the plane shape of the protective body 32 grows to 30 Å or more to 1000 Å or less, the sputtering of the metal target 61 and the plasmatization of the reactive gas are stopped before the entire surface of the transparent conductive film 31 is covered with the protective bodies 32. At this time, the film formation is terminated.

The substrate 11 having the protective bodies 32 formed is carried out of the vacuum chamber 51, and attached to a display surface 24 of the display panel 19. After the spacers 29 are disposed on the surface of the lower electrode layer 30, a touch panel 1 as shown in FIG. 1 can be obtained by bonding the display device 10 to the flexible panel 20.

When the film formation is performed in a state such that the substrate is kept still relative to the target and the ion gun as in another technology, the substrate is heated to a high temperature. Consequently, the substrates have been limited to heat-resistant ones such as the glass substrates.

Since the substrate 11 is not kept still relative to the targets 61 to 63 and the ion gun 55 in the above-described metal mode, the substrate 11 is not heated to a high temperature, so that a plastic substrate such as a resin film can be also used as the substrate 11, in addition to the glass substrate. Thus, the substrate 11 does not have to be a glass substrate.

A flexible film 21 is used as the substrate to be held, and a flexible panel 40 may be produced by forming a first transparent electrode (upper electrode layer 45) having a transparent conductive film 41 and protective bodies 42 on a surface of the flexible film 21 in the above-described steps.

Figure 3:
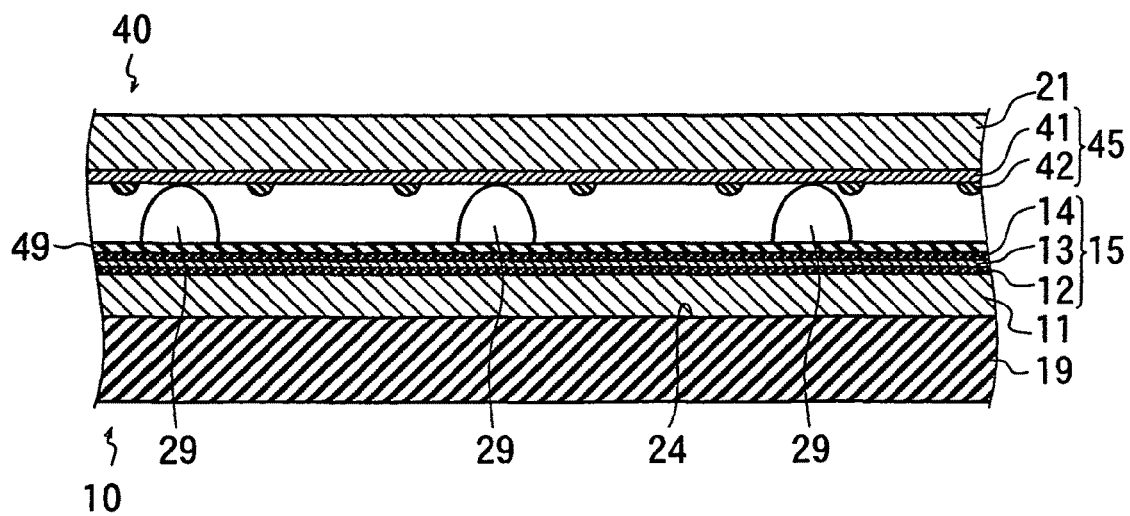
FIG. 3 is a sectional view for illustrating a touch panel of a second embodiment.

A display device 10 having a second transparent electrode (lower electrode layer 49) made of a transparent conductive film is prepared, and the display device 10 and the flexible panel 40 are bonded together via spacers 29 in the state that the upper electrode layer 45 is facing toward the lower electrode layer 49, whereby a touch panel 4 as shown in FIG. 3 can be obtained.

When the flexible panel 40 of the touch panel 4 is pressed, the protective bodies 42 are in contact with the lower electrode layer 49 first, and then the transparent conductive film 41 exposed between the protective bodies 42 is in contact with the lower electrode layer 49. Since a larger load is applied to the protective bodies 42 than the transparent conductive film 41, the transparent conductive film 41 is less likely to be broken.

The above explanation has been made of the case in which either one of the flexible panel and the display device is taken as a first panel, and the protective bodies 32, 42 are provided on either one of the upper electrode layer and the lower electrode layer (first and second transparent electrodes), but the present invention is not limited thereto. It may be that both of the upper electrode layer and the lower electrode layer, that is, both of the first and second transparent electrodes are constituted by the transparent electrode films and the protective bodies, and the transparent conductive films and the protective bodies are exposed in both the first and second transparent electrodes.

Although the film thickness of the protective bodies 32 is not particularly limited, if the protective bodies 32 grow too much, not only the film thickness but also the plane shapes become greater, so that the adjacent protective bodies 32 are integrated and the transparent conductive film 31 is covered with the protective bodies. Thus, the film forming time is desirably shortened so that the film thickness of the protective bodies 32 may be less than 2.5 nm (a target value when the film is formed).

In order that the first and second transparent electrodes may be sure to be conductive, the plane shapes of the protective bodies 32 are desirably set to 30 Å or more and 1000 Å or less (3 nm or more to 100 nm or less) in diameter.

In the above, the case in which the entire protective bodies 32 are made of the metal oxide and/or the metal nitride has been explained, but the invention is not limited thereto. For example, the atomic layer can be formed thicker, and when it is exposed to the plasma of the reactive gas in a manner so that only a surface portion of that atomic layer may be oxidized and/or nitrided, the protective bodies having protecting film of the metal oxide and/or the metal nitride formed on the surface portion of the metal atomic layer can be obtained.

The formation of the atomic layer and the oxidizing and/or nitriding may be performed in different vacuum chambers or in the same vacuum chamber. For example, after the atomic layer is formed by sputtering the metal target 61 inside the film forming apparatus 50 of FIG. 2 without plasmatizing the reactive gas, the sputtering of the metal target 61 can be stopped and the oxidation and/or the nitriding can be carried out by plasmatizing the reactive gas.

The formation of the protective bodies 32 is not limited to the sputtering method. For example, a metal atomic layer can be formed in the vacuum atmosphere by generating a vapor of a metallic material made of either one or both of Ti and Nb and bringing the vapor into a surface of the transparent conductive film 31 on the substrate 11.

Then, when the metal atomic layer is exposed to the plasmatized reactive gas (nitriding gas and/or oxidizing gas), the metal nitride and/or the metal oxide is generated on at least the surface portion of the metal atomic layer, and thus, the protective bodies 32 are formed.

Further, it may be that a raw material liquid, in which a material constituting the protective bodies 32 (the metal oxide or the metal nitride) is dispersed in a solvent, is poured into a tank of an ink jet printer; the raw material liquid is discharged onto a surface of the transparent conductive film 31 through a nozzle of the ink jet printer; liquid drops scattered on the surface of the transparent conductive film 31 are formed; excess solvent is removed through drying; and the protective bodies 32 are formed.

The metals used for the protective bodies 32 are not limited to Ti or Nb. For example, a metal atomic layer may be formed by sputtering a metal target containing at least one kind of metals selected from the group consisting of Nb, Ti, Mg, Zr, V, Ta, Cr, Mo, W, Fe, Ni, Pd, Pt, Cu, Ag, Au, Zn, Al, In, C, Si and Sn.

In this case, at least a surface portion of the protecting film contains either one or both of at least one kind of an oxide of the metallic materials selected from the group consisting of Nb, Ti, Mg, Zr, V, Ta, Cr, Mo, W, Fe, Ni, Pd, Pt, Cu, Ag, Au, Zn, Al, In, C, Si and Sn and a nitride of the above metallic materials.

Among the above-mentioned metals, Nb, Ti, Zr, Ta and Si are particularly desirable from the viewpoint of the transparency, the mechanical strength or the like of the reaction product.

Any of the metal oxides, the metal nitrides and mixtures thereof has high transparency, but the metal nitrides are inclined to be colored yellowish as compared with the metal oxides. Therefore, at least the surface portions of the protective bodies are desirably composed mainly of the metal oxide. More concretely, the metal oxides include titanium oxides (TiO, $TiO_2$, $Ti_2O_3$, $Ti_2O_5$, etc.), niobium oxides ($Nb_2O_5$, etc.), tantalum oxides ($Ta_2O_5$, etc.), zirconium oxides ($ZrO_2$, etc.), and silicon oxides ($SiO_2$, $Si_2O_3$, $Si_3O_4$, etc.).

The transparent conductive film 31 is not particularly limited, and for example, it may be made of a transparent oxide composed mainly of $In_2O_3$ and containing 0.1 atom % or more to 20 atom % or less of at least one kind of element selected from an element group consisting of the 2A group, the 4A group, the 2B group and the 4B group, a transparent oxide composed mainly of ZnO and containing 0.1 atom % or more to 20 atom % or less of at least one kind of element selected from an element group consisting of the 1A group, the 3A group, the 4A group and the 1B group, the 3B group and the 4B group, or a transparent oxide composed mainly of $SnO_2$ and containing 0.1 atom % or more to 20 atom % or less of at least one kind of element selected from an element group consisting of the 3A group, the 3B group, the 5A group and the 5B group.

As the reactive gas, either one or both of an oxidizing gas containing an oxygen atom in a chemical structure and a nitriding gas containing a nitrogen atom in a chemical structure can be used. As the oxidizing gas, $O_2$, $O_3$, $H_2O$ and the like can be used, and as the nitriding gas, $N_2$, $NH_3$ and the like can be used. One kind of these reactive gases may be used alone, or a mixed gas of two or more kinds may be used.

The antireflective layer 15 is not limited to the case where it is provided in the display device 10. The antireflective layer 15 may be provided between the upper electrode layer 27 of the flexible panel 20 and the flexible film 21. In addition, the lower electrode layer 30 may be provided directly on the substrate 11 (or the display surface 24) without the antireflective layer 15 being provided on the display device 10. The antireflective layers 15 may be provided in both of the display device 10 and the flexible panel 20.

The present invention is not limited to the case where the protective bodies 32 and the transparent conductive film 31 are exposed on the surface of the first transparent electrode 30. For example, the surface of the first transparent electrode 30 may be covered with other transparent film such as ITO or $SiO_2$.

When the temperature of the substrate 11 is too low, flocculation of the metal is less likely to occur, so that the temperature of the substrate 11, at the time a film of the protective bodies 32 is formed, is desirably 80° C. or higher. Furthermore, there is a concern that the substrate may be deformed when the substrate is a plastic substrate and the temperature is too high. Thus, temperature of the substrate 11 is desirably 100° C. or less when forming the film of the protective bodies 32.

EXAMPLES

Substrates 11 were attached to the rotary body 52 of the film forming apparatus 50 of FIG. 2; an oxygen gas was used as a reactive gas; and a film of $SiO_2$ ($Si_xO_y$, x and y are actual numbers), a film of $Nb_2O_5$ ($Nb_xO_y$, x and y are actual numbers) and a film of $SiO_2O_y$, x and y are actual numbers) were laminated in the above-described steps in the described order by using a metal target 61 made of Nb and an inorganic target 62 of Si, thereby forming an antireflection layer 15.

Then, while an optimum amount of oxygen for supplementing an oxygen loss is being introduced into the vacuum chamber 51, a transparent conductive film 31 was formed on a surface of the antireflective layer 15 by sputtering a transparent conductive material target 63 made of ITO ($In_2O_3$ as a main component with $SnO_2$ added in 10% by weight) or AZO (ZnO as a main component with $Al_2O_3$ added in 2% by weight), which is used as an object to be processed.

Test pieces in the below-mentioned Examples 1 to 10 and Comparative Examples 1 and 2 were prepared by using the objects to be processed in which the transparent conductive film 31 was made of ITO, among the above objects to be processed, the below-mentioned Examples 11 and 12 and Comparative Example 3 were prepared by using the objects to be processed in which the transparent conductive film 31 was made of the AZO.

Example 1

The object to be processed was taken out from the film forming apparatus 50, and carried into a vacuum chamber of the sputtering apparatus. A metal target 61 made of Nb was arranged in the vacuum chamber, and the object to be processed was faced toward the metal target 61. The vacuum chamber was evacuated to vacuum, and an island-shaped thin film of the Nb oxide ($Nb_xO_y$) was formed as protective bodies 32 by sputtering the metal target 61, while both a reactive gas (oxygen gas) and a sputtering gas were being fed into a space between the metal target 61 and the object to be processed (Reactive sputtering). The film thickness of the $Nb_xO_y$ thin film was calculated to be 0.5 nm based on the film forming time.

Example 2

The rotary body 52 was rotated in the state that the object to be processed was attached to the rotary body 52 of the film forming apparatus 50; the metal target 61 made of Nb was sputtered; the reactive gas of the oxygen gas was plasmatized; and an island-shaped $Nb_xO_y$ thin film was formed as protective bodies 32 by the above-mentioned metal mode. The film thickness of the $Nb_xO_y$ thin film was calculated to be 0.5 nm based on the film forming time.

Example 3

The object to be processed was taken out from the film forming apparatus 50, and carried into the vacuum chamber of the sputtering apparatus. While the vacuum chamber was being evacuated to vacuum, an atomic layer (Nb atomic layer) was formed in a scattered fashion on a surface of the transparent conductive film 31 by introducing an Ar gas as a sputtering gas into the vacuum chamber and sputtering the metal target 61 made of Nb inside the vacuum chamber.

Next, while the reactive gas of the oxygen gas was being introduced into the vacuum chamber, protective bodies 32 made of the Nb atomic layer and a $Nb_xO_y$ protecting film covering the Nb atomic layer were formed by irradiating an ion beam toward the object to be processed from the ion gun. The film thickness of the protective body was calculated to be 0.5 nm based on the film forming time.

Example 4

An object to be processed was taken out from the film forming apparatus 50, and carried into vacuum chamber of the sputtering apparatus. While only the sputtering gas was being introduced into the vacuum chamber without introducing the reactive gas, an atomic layer (Nb atomic layer) was formed in a scattered fashion on a surface of the transparent conductive film 31 by sputtering the metal target 61.

Protective bodies 32 made of the Nb atomic layer and a $Nb_xO_y$ film were formed by forming an $Nb_xO_y$ thin film on the surface of the object to be processed in which the atomic layer has been formed under the same condition as in Example 1. The film thicknesses of the Nb atomic layer and the $Nb_xO_y$ thin film were respectively calculated to be 0.5 nm based on the film forming time.

Example 5

After protective bodies 32 were formed on a surface of the object to be processed under the same condition as in Example 4, an ITO thin film was formed on the protective bodies 32 by sputtering a transparent conductive material target 63 made of ITO inside the vacuum chamber, while the sputtering gas and the reactive gas ($O_2$) were being introduced into the vacuum chamber of the sputtering apparatus. Film thicknesses of the Nb atomic layer, the $Nb_xO_y$ thin film and the ITO thin film were respectively calculated to be 0.5 nm based on the film forming times.

Example 6

Protective bodies 32 made of a thin film of a Ti oxide ($Ti_xO_y$, x and y being actual numbers) were formed under the same condition as in Example 3 except that the metal target 61 was replaced by a target made of Ti. The film thickness of the $Ti_xO_y$ thin film was calculated to be 0.5 nm based on the film forming time.

Example 7

Protective bodies 32 made of a Ti atomic layer and a $Ti_xO_y$ protecting film were formed under the same condition as in Example 4 except that the metal target 61 was replaced by a target made of Ti. The film thickness of the Ti atomic layer and the $Ti_xO_y$ protecting film were respectively calculated to be 0.5 nm based on the film forming time.

Example 8

A Ti atomic layer and a protecting film of a Ti nitride ($Ti_xN_y$, x and y being actual numbers) were formed as protective bodies 32 under the same condition as in the above-described Example 7 except that the reactive gas was replaced by a nitrogen ($N_2$) gas. The film thicknesses of the Ti atomic layer and the $Ti_xN_y$ protecting film were respectively calculated to be 0.5 nm based on the film forming time.

Example 9

A Ti atomic layer and a protecting film of a mixture of a Ti oxide and a Ti nitride ($Ti_xO_yN_z$, x, y and z being actual numbers) were formed as protective bodies 32 under the same condition as in the above-described Example 7 except that the reactive gas was replaced by a mixed gas of the nitrogen ($N_2$) gas and the oxygen gas ($O_2$). The film thicknesses of the Ti atomic layer and the protecting film of $Ti_xO_yN_z$ were respectively calculated to be 0.5 nm based on the film forming time.

Example 10

Protective bodies 32 were formed under the same condition as in Example 7. A target made of Si was preliminarily placed inside the vacuum chamber of the sputtering apparatus, and a thin film of $Si_xO_y$ (x and y being actual numbers) was formed by sputtering the target, while the sputtering gas and the oxygen gas were being introduced into a space between the target and the object to be processed. The film thickness of the $Si_xO_y$ thin film was calculated to be 0.5 nm based on the film forming time.

Example 11

Protective bodies 32 were formed under the same condition as in the above-described Example 4 except that an object to be processed having a transparent conductive film 31 made of an AZO thin film was used.

Example 12

Protective bodies 32 were formed under the same condition as in the above-described Example 7 except that an object to be processed having a transparent conductive film 31 made of an AZO thin film was used.

Comparative Example 1

An object to be processed having a transparent conductive film 31 made of ITO was taken as a test piece without modification.

Comparative Example 2

While a target made of Nb was being sputtered without the introduction of the oxygen gas or the discharge of the ion beam, the rotary body 52, to which the object to be processed was attached, was rotated, and the protective bodies 32 of a Nb atomic layer were formed in island shapes. The film thickness of the Nb atomic layer was calculated to be 0.5 nm based on the film forming time.

Comparative Example 3

An object to be processed having a transparent conductive film 31 made of an AZO thin film was used as a test piece without modification.

Since the film thickness of 0.5 nm is too thin, it is difficult to physically measure the film thickness. Therefore, a thick film enabling the film thickness to be measured was formed, and the relationship between the film thickness and the film forming time was preliminarily determined. Based on this relationship, a film forming time necessary for forming the thin film of 0.5 nm was determined, and the thickness (target value) of a film formed during the film forming time was taken as 0.5 nm.

<Observation of Surface States>

Surfaces of test pieces of Comparative Examples 1, 2, Examples 1 to 6, Example 9 and Example 11 were photographed at a magnification of 100,000 with a scanning-type electron microscope (SEM). The SEM photographs of Comparative Examples 1, 2, Examples 1 to 6, Example 9 and Example 11 are shown in FIGS. 5 to 14, respectively.

Figure 5:
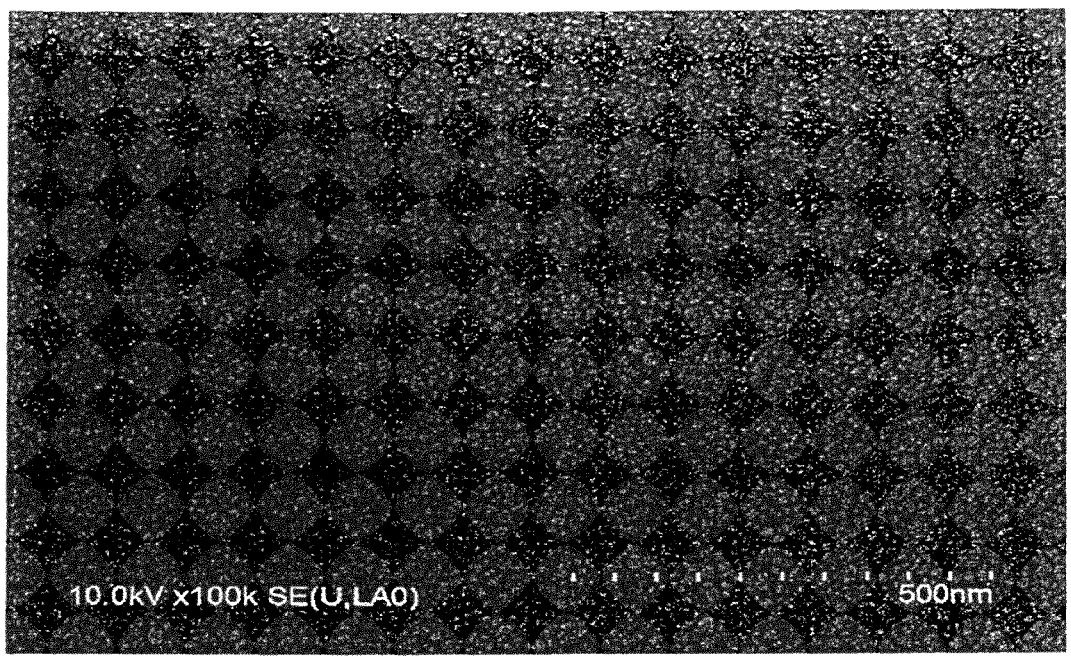
FIG. 5 is a SEM photograph of Comparative Example 1.

Referring to FIG. 5, it is found that the surface of the transparent conductive film 31 is kept flat when no protective bodies 32 are formed.

Figure 6:
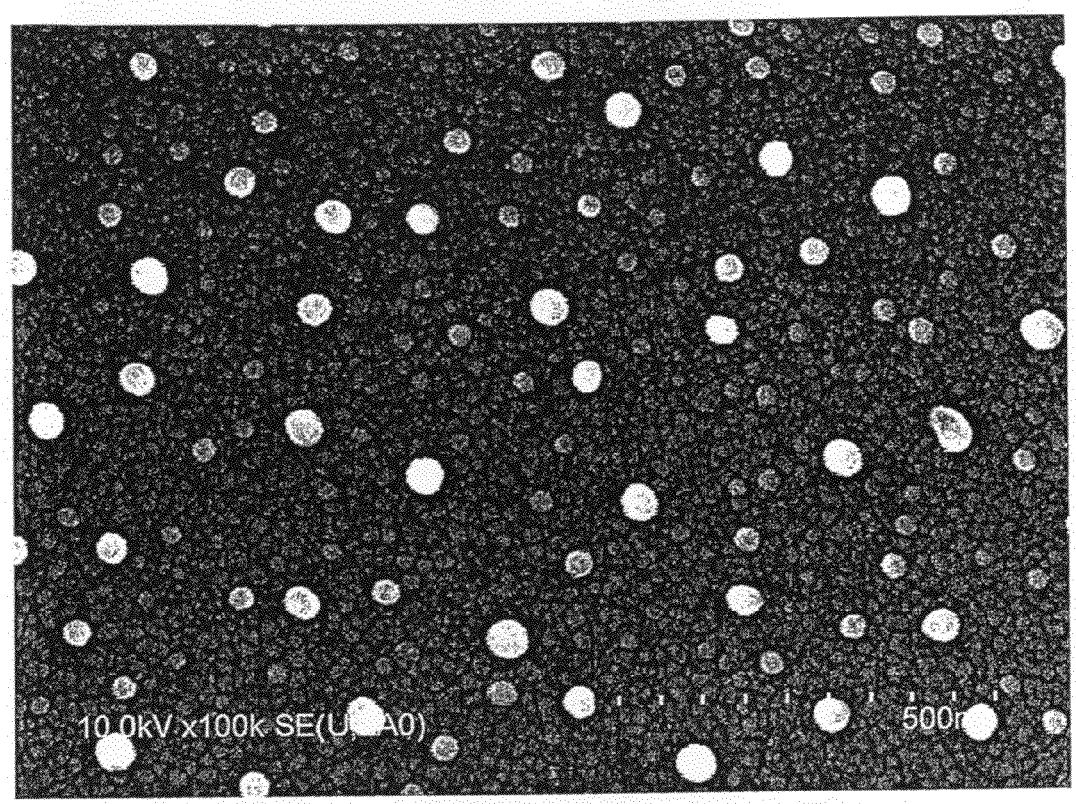
FIG. 6 is a SEM photograph of Comparative Example 2.
Figure 7:
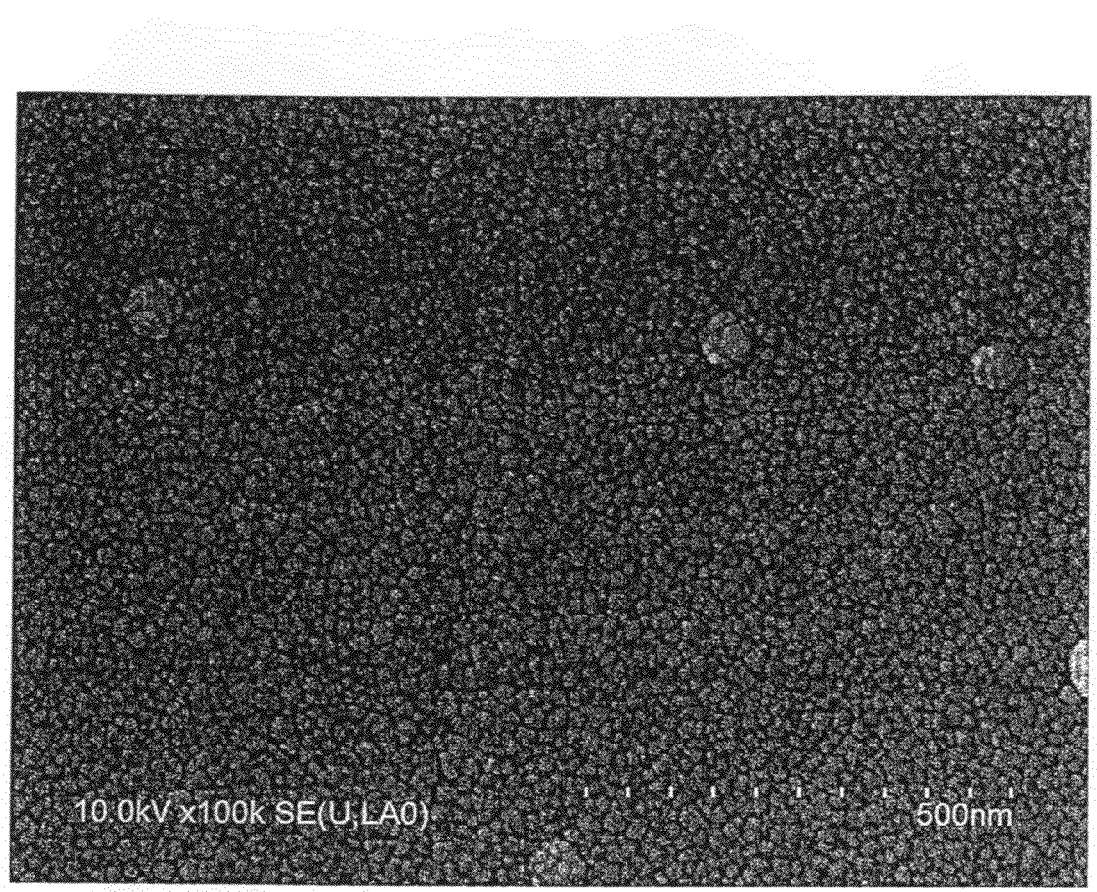
FIG. 7 is a SEM photograph of Example 1.

Referring to FIG. 6, the Nb atomic layer is formed in a scattered fashion and piled up in the form of islands. It is found that the metal atoms, which are not oxidized or nitrided, are likely to be flocculated.

As compared with FIG. 6 and FIG. 8 to FIG. 14, FIG. 7 shows that there were fewer island-shaped protective bodies 32. The protective bodies 32 in Example 1 are a film formed by the reactive sputtering. Since the reactive gas is fed between the target and the substrate 11 in the reactive sputtering, the surface of the target is oxidized or nitrided, and the metal oxide or the metal nitride reaches on the substrate 11. Accordingly, it is presumed that no flocculation occurred.

Figure 8:
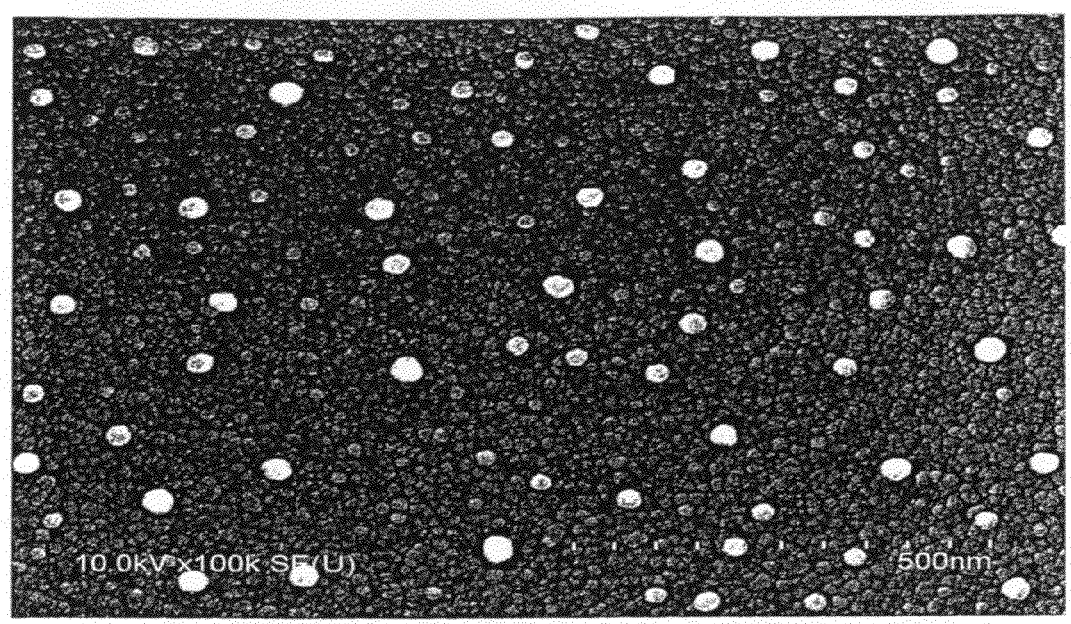
FIG. 8 is a SEM photograph of Example 2.
Figure 9:
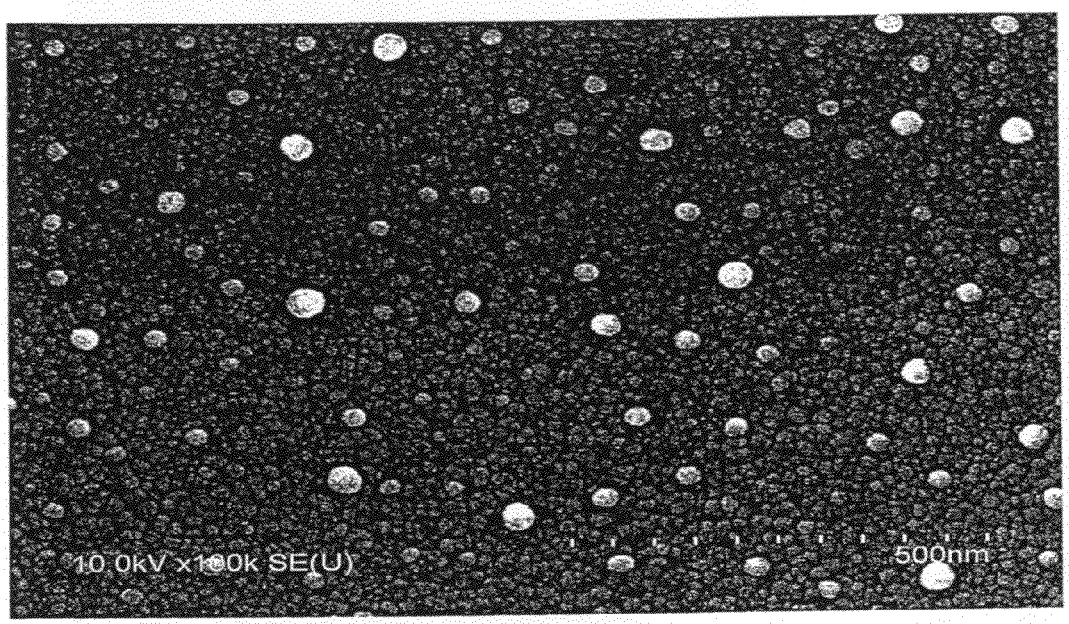
FIG. 9 is a SEM photograph of Example 3.
Figure 10:
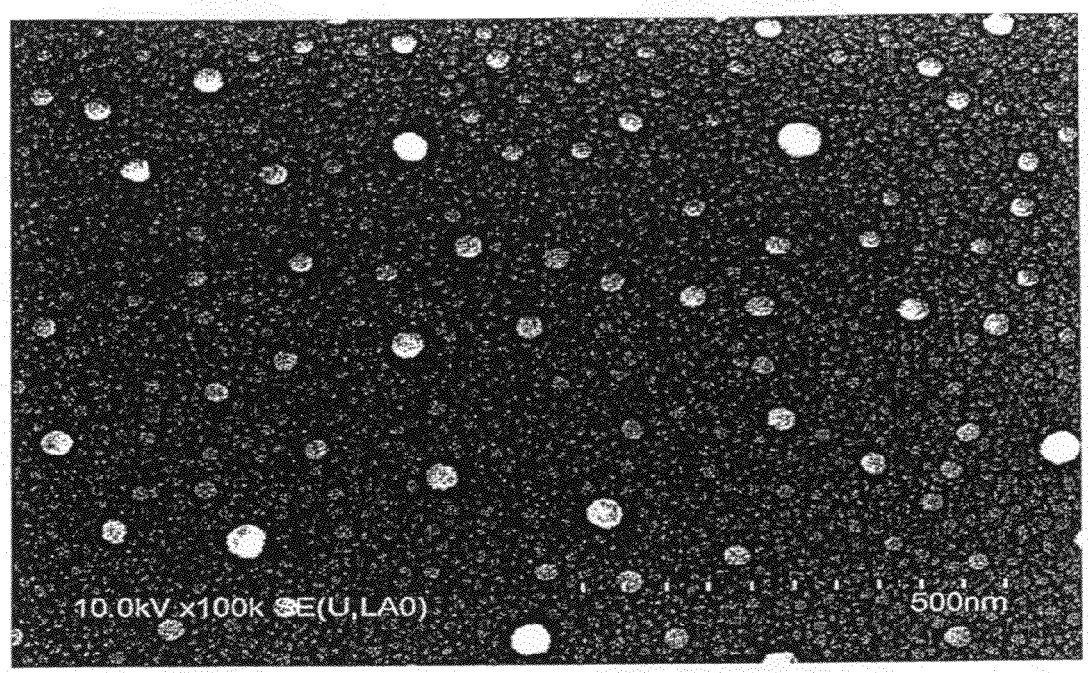
FIG. 10 is a SEM photograph of Example 4.
Figure 11:
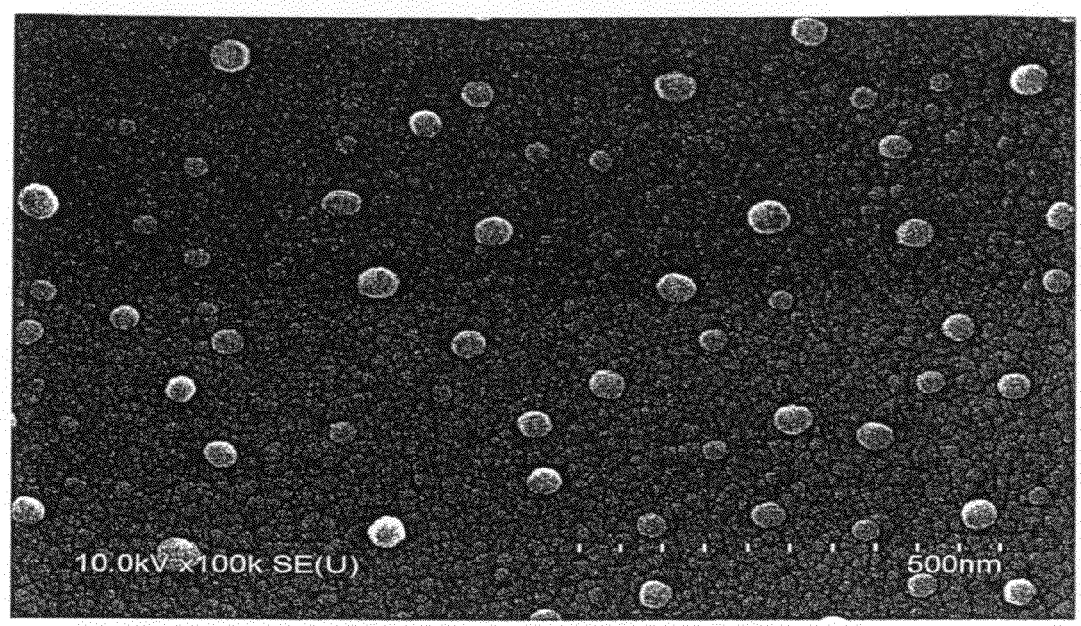
FIG. 11 is a SEM photograph of Example 5.
Figure 12:
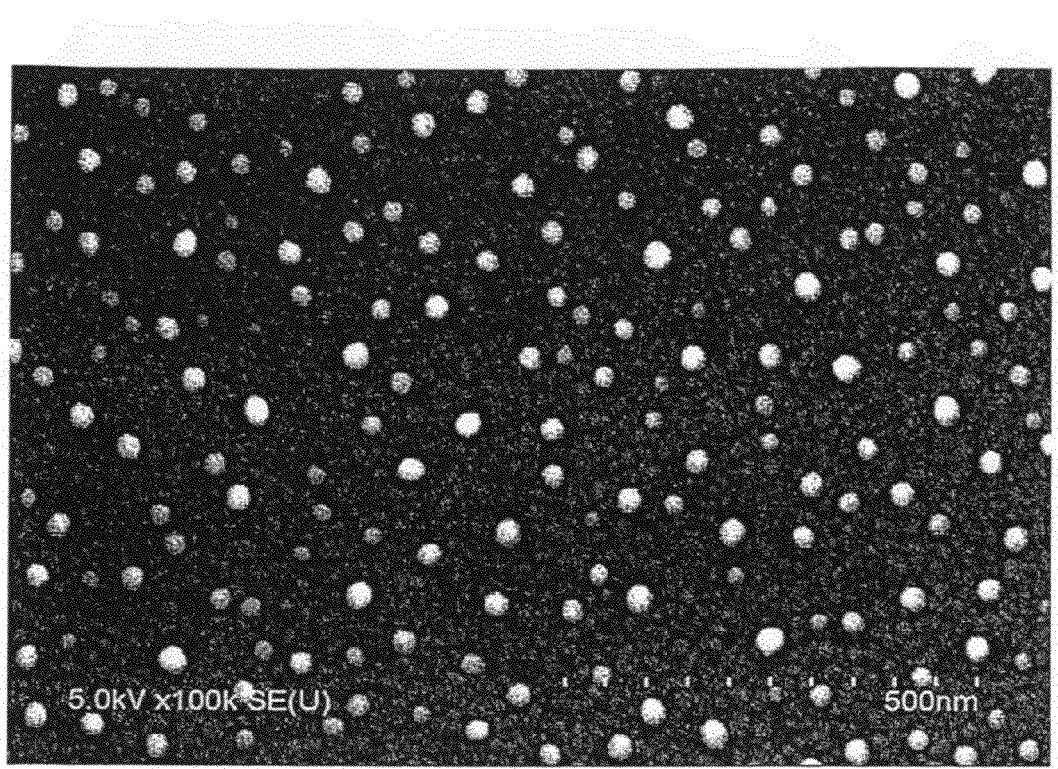
FIG. 12 is a SEM photograph of Example 6.
Figure 13:
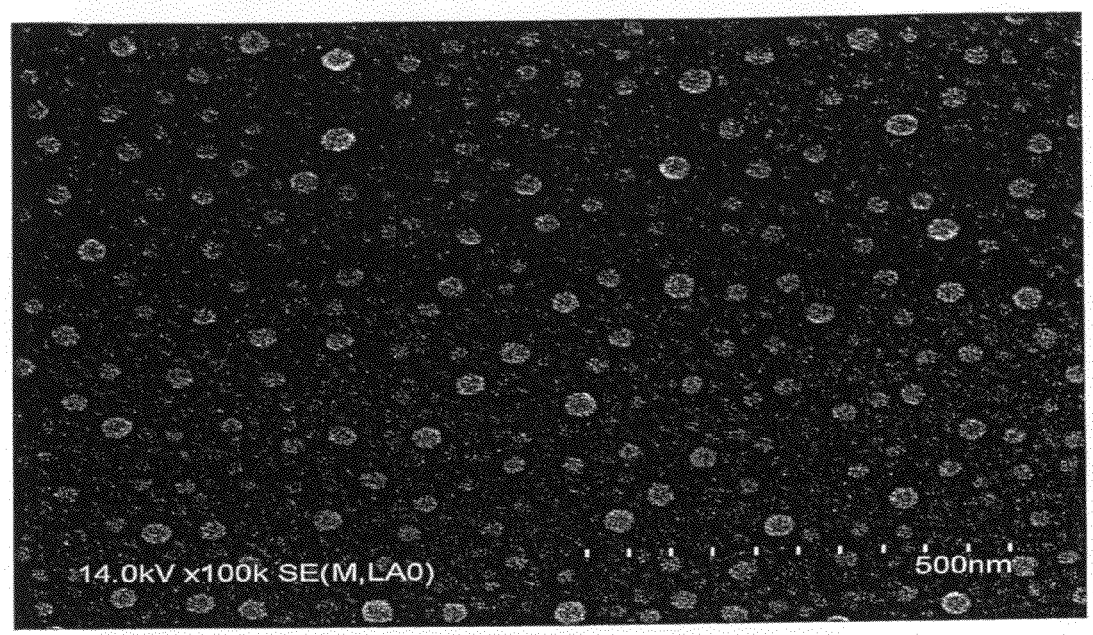
FIG. 13 is an SEM photograph of Example 9.

On the other hand, referring to FIG. 8, the protective bodies 32 are formed in a scattered fashion and piled up in the form of the islands. In Example 2, since the step of forming the metal atomic layer and the step of reacting the metal atomic layer with the reactive gas are repeatedly carried out (metal mode), it is presumed that the flocculation occurs when the metal atomic layer is formed.

In FIGS. 9 to 14 as well, it is confirmed that protective bodies 32 are also piled up in the form of islands, and, irrespective of the film forming method and the kinds of the metal and the reactive gas, the flocculation occurs, if the metal atomic layer is once formed.

That is, it is seen that the island-shaped protective bodies 32 are formed, if the metal atomic layer is reacted with the plasmatized reactive gas or when a layer of a reaction product between the metal and the reactive gas is formed on the metal atomic layer by the reactive sputtering, after the metal atomic layer is formed on the surface of the transparent conductive film 31.

Figure 14:
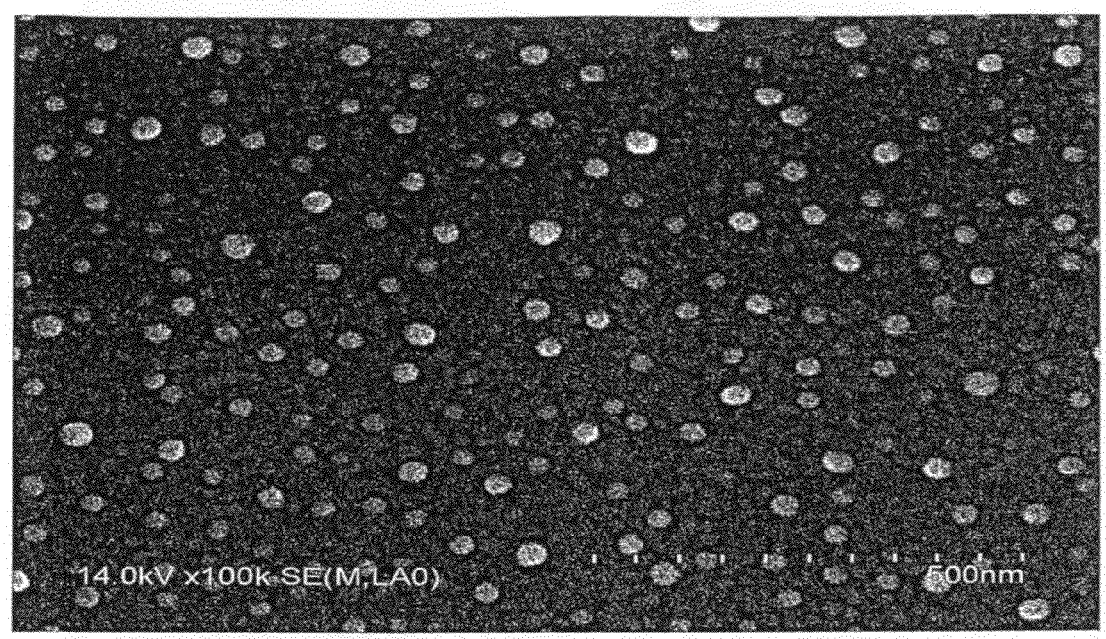
FIG. 14 is a SEM photograph of Example 11.

Meanwhile, the protective bodies 32 are piled up in the form of islands in FIG. 14, and it was confirmed that the island-shaped protective bodies 32 are formed according to the film forming method of the present invention, irrespective of the kind of the transparent conductive film 31.

Sliding characteristics tests shown below were carried out by using the test pieces in the above-described Examples 1 to 12 and Comparative Examples 1 to 3.

<Sliding Characteristics Tests>

Figure 4:
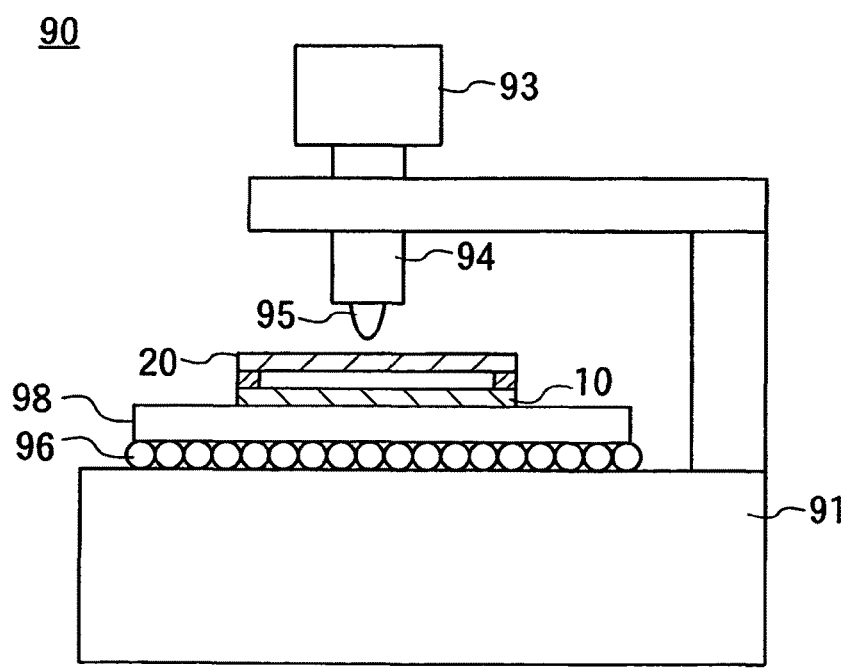
FIG. 4 is a schematically sectional view for illustrating a sliding tester.

Reference numeral 90 of FIG. 4 shows a sliding tester. The sliding tester 90 has a base 91; ball bearings 96 are arranged on the base 91; and a stage 98 is placed on the ball bearings 96.

A test panel was prepared by bonding each test piece to the flexible panel 20 of FIG. 1 together with a double-faced adhesive tape such that the surface on which the protective bodies 32 were formed was facing toward the upper electrode layer 27.

Each test panel was placed on the stage 98 with the face on a side of the flexible panel 20 facing upward, and an oscillator tip portion 95 made of a resin was attached to a lower end of an oscillator 94 above the stage 98.

Further, a load 93 was attached to an upper end of the oscillator 94 so that the total amount of the oscillator 94, the oscillator tip portion 95 and the load 93 might become 250 grams force (gf). While the flexible panel 20 was pressed with the oscillator tip portion 95, the oscillator 94 was reciprocated with the load of 250 gf.

After 100,000 reciprocations, 200,000 reciprocations and 300,000 reciprocations, the surface of the lower electrode layer 30 of the test panel was observed, and evaluations were made such that one having no flaw observed at the surface of the lower electrode layer 30 was taken as a circle, one having a flaw partially observed was taken as a triangle, and one having a flaw observed over the entire slid portion was taken as an X. Evaluation results are listed in Table 1 below.

TABLE 1

Composition of protective bodies, film forming method and results of sliding tests

| | Transparent conductive film | Protective bodies Composition | Film forming method | Sliding characteristics 100,000 reciprocations | 200,000 reciprocations | 300,000 reciprocations |
|---|---|---|---|---|---|---|
| Comparative Example 1 | ITO | — | — | X | X | X |
| Comparative Example 2 | ITO | Nb | Sputtering | ○ | Δ | X |
| Example 1 | ITO | $Nb_xO_y$ | Reactive sputtering | ○ | ○ | Δ |
| Example 2 | ITO | $Nb_xO_y$ | Metha mode | ○ | ○ | ○ |
| Example 3 | ITO | $Nb_xO_y$ | Ion gun | ○ | ○ | ○ |
| Example 4 | ITO | $Nb/Nb_xO_y$ | Reactive sputtering | ○ | ○ | ○ |
| Example 5 | ITO | $Nb/Nb_xO_y/ITO$ | Reactive sputtering | ○ | ○ | ○ |
| Example 6 | ITO | $Ti_xO_y$ | Ion gun | ○ | ○ | ○ |
| Example 7 | ITO | $Ti/Ti_xO_y$ | Reactive sputtering | ○ | ○ | ○ |
| Example 8 | ITO | $Ti/Ti_xN_y$ | Reactive sputtering | ○ | ○ | ○ |
| Example 9 | ITO | $Ti/Ti_xO_yN_z$ | Reactive sputtering | ○ | ○ | ○ |
| Example 10 | ITO | $Ti/Ti_xO_y/Si_xO_y$ | Reactive sputtering | ○ | ○ | ○ |
| Comparative Example 3 | AZO | — | — | X | X | X |
| Example 11 | AZO | $Nb/Nb_xO_y$ | Reactive sputtering | ○ | ○ | ○ |
| Example 12 | AZO | $Ti/Ti_xO_y$ | Reactive sputtering | ○ | ○ | ○ |

○: No scratch seen, Δ: Scratches partially seen, X: Scratches seen over entire slid portion As is clear from the above-described Table 1, it is confirmed that abrasion resistance is high if a protecting film containing either one or both of the metal oxide and the metal nitride is formed in at least the surface portions of the protective bodies 32.

<Surface States and Sliding Tests>

In the test pieces of the above-described Comparative Example 1, and Examples 1 and 6, the number of islands (protective bodies 32) in an observation area of 950 nm×1270 nm (1.2 µm²) was counted. The number of the islands in the observation area and the number (density) obtained by converting the number of the islands to a number per 1 µm² are listed in Table 2 below.

TABLE 2

Number of protective bodies (islands) and results of sliding test

| | Number of islands | Density of islands [number/µm²] | Sliding characteristics 100,000 reciprocations | 200,000 reciprocations | 300,000 reciprocations |
|---|---|---|---|---|---|
| Comparative Example 1(a) | 0 | 0 | X | X | X |
| Example 1(b) | 4 | 3 | ○ | ○ | Δ |
| Example 1a(c) | 37 | 31 | ○ | ○ | ○ |
| Example 6(d) | 176 | 147 | ○ | ○ | ○ |
| Example 6a(e) | 245 | 204 | ○ | ○ | ○ |
| Example 6b(f) | 437 | 364 | ○ | ○ | Δ |

○: No scratch seen,
Δ: Scratches partially seen,
X: Scratches seen over entire slid portion In addition, each of test pieces was prepared under the same condition as in Examples 1 and 6 except that the film forming time was prolonged in order to increase the number of the islands. With respect to these test pieces, SEM photographs were taken under the same condition as in Examples 1 and 6.

Figure 15:
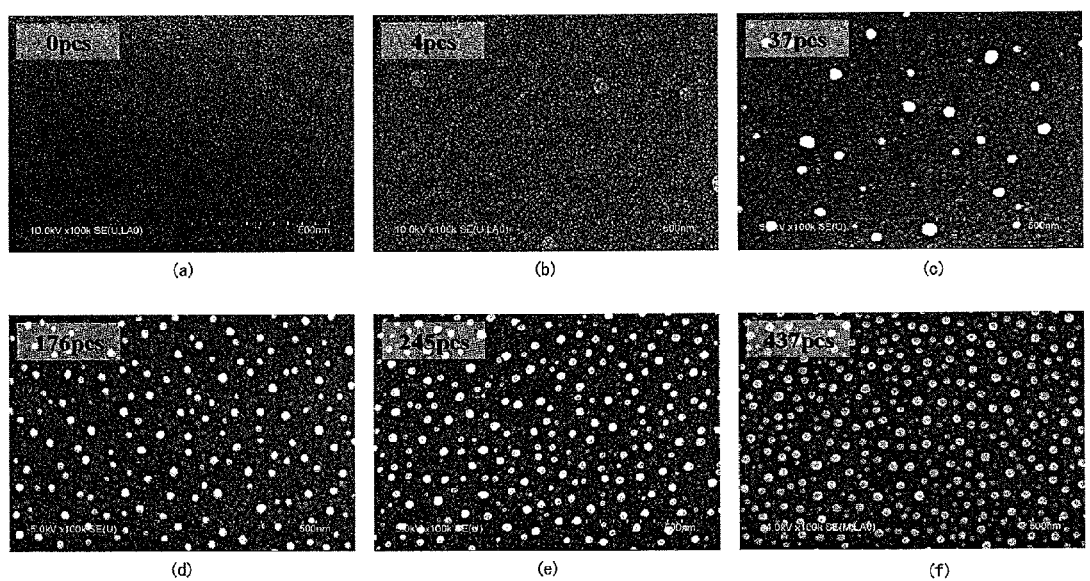
FIG. 15 gives SEM photographs of Comparative Example 1, Examples 1 and 1a, and Examples 6, 6a and 6b.

FIGS. 15(a) to (f) are SEM photographs of the test pieces: FIG. 15(a) is Comparative Example 1; FIG. 15(b) is Example 1; FIG. 15(c) is Example 1a in which the film forming time of Example 1 was prolonged; FIG. 15(d) is Example 6; FIG. 15(e) is Example 6a in which the film forming time of Example 6 was prolonged; and FIG. 15(f) is Example 6b in which the film forming time was further prolonged than in Example 6a.

The number of islands in each test piece was measured from the SEM photograph under the same condition as in Comparative Example 1 and Examples 1 and 6, and the density of the islands was calculated. In addition, the above-described sliding characteristics tests were also carried out. Results thereof are listed in Table 2 above.

As is seen from Table 2 above, since the protective bodies 32 were formed by the reactive sputtering in Example 1, the number of the islands is small, and the sliding characteristics are inferior as well. However, if the film forming time is prolonged, as in Example 1a, even in the same reactive sputtering method as in Example 1, the number of the islands increases and the sliding characteristics are improved.

However, in Examples 6, 6a and 6b in which the metal atomic layer is first formed, the number of the islands is greater as compared with Examples 1 and 1a. Since the film forming speed is also slow in the case of the reactive sputtering, it is understood that, in the present invention, the reaction in which the metal atomic layer is reacted with the reactive gas is better than the reactive sputtering method in which a layer of the reaction product between the metal and the reactive gas is formed from the beginning.

Example 1a and Examples 6, 6a and 6b have practically sufficient sliding characteristics. Since the sizes (diameters) of the islands in Examples were 100 Å or more to 600 Å or less (10 nm or more to 60 nm or less), the film forming time needs to be controlled so that the protective bodies 32 having the diameters of 10 nm or more to 60 nm or less are present at a ratio of 3 or more to 364 or less per 1 µm$^2$, in order to obtain the practically sufficient sliding characteristics.

Meanwhile, when the reactive gas was plasmatized and the film formation were carried out in the metal mode while the metal target 61 was being sputtered in the above-described film forming apparatus 50, the sputtering speed almost did not change as compared with a case where the metal target 61 was sputtered without the introduction of the reactive gas. This shows that no reaction product is formed on the surface of the metal target 61 in the metal mode.

To the contrary, when sputtering was carried out in another reactive sputtering apparatus by feeding the sputtering gas and the $O_2$ gas into a space between the Si target and an object to processed, the sputtering speed was decreased to ⅓ as compared with a case where the sputtering was carried out by feeding the sputtering gas alone. When the sputtering speed is slow, the film forming speed becomes lower. Therefore, the method, in which, after the metal atomic layer is formed, the metal atomic layer is reacted with the reactive gas, is the most efficient.

<Kinds of Metallic Materials>

Figure 16:
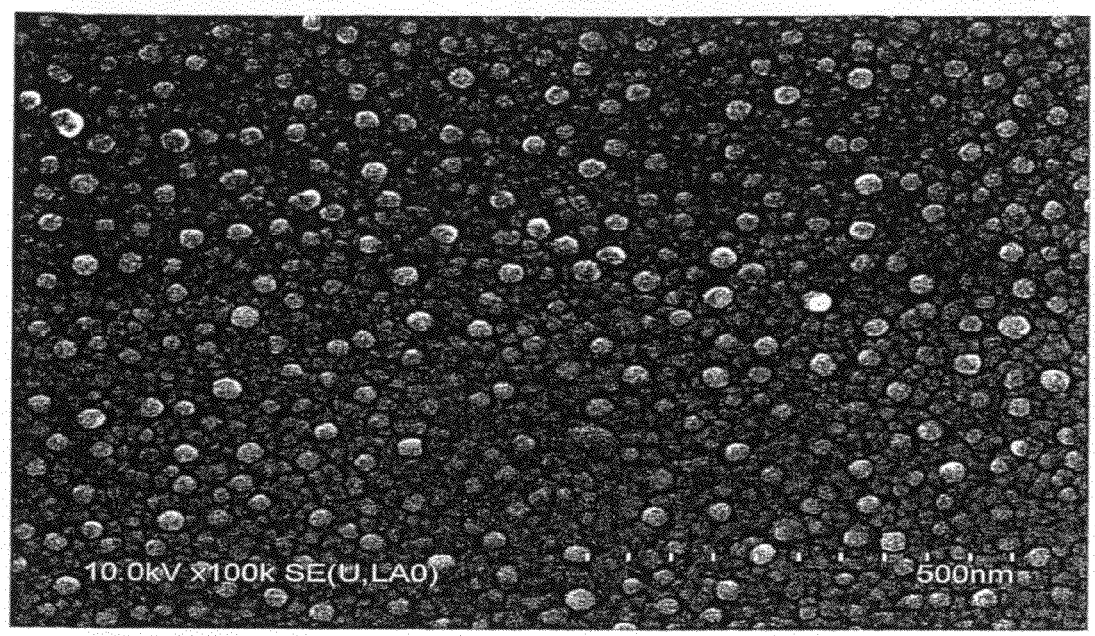
FIG. 16 is a SEM photograph of Example 13.
Figure 17:
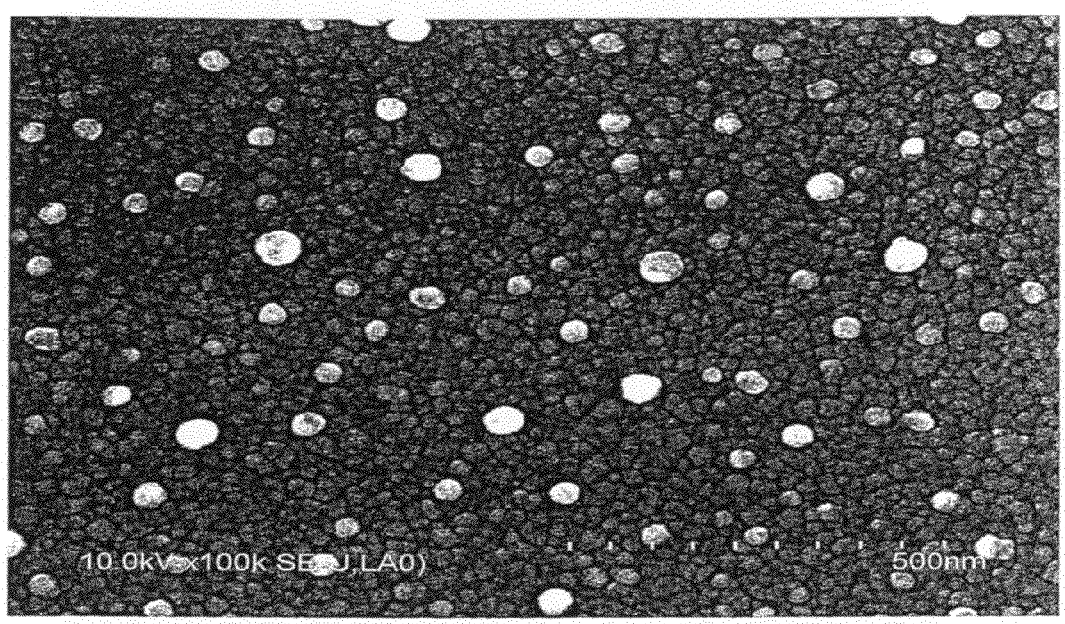
FIG. 17 is a SEM photograph of Example 14.
Figure 18:
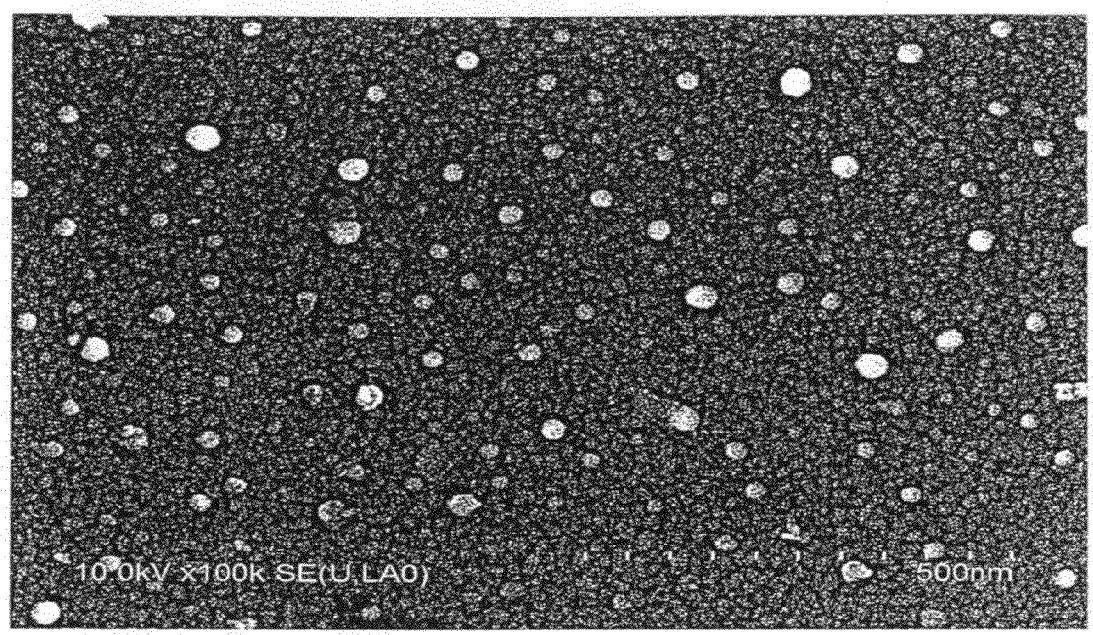
FIG. 18 is a SEM photograph of Example 15.

Test pieces in Examples 13 to 15 were prepared under the same condition as in Example 3 except that the constituent material of the metal target 61 was changed from Nb to Zr, Ta or Si. SEM photographs were taken, and the above-described "Sliding characteristics tests" were carried out. The SEM photographs of Examples 13 to 15 are shown in FIGS. 16 to 18, and results of the sliding characteristics tests are listed in Table 3 below.

TABLE 3

Composition of protective bodies, film forming method, and results of sliding test

| | Transparent conductive film | Protective bodies | | Sliding characteristics | | |
| --- | --- | --- | --- | --- | --- | --- |
| | | Composition | Film forming method | 100,000 reciprocations | 200,000 reciprocations | 300,000 reciprocations |
| Example 13 | ITO | Zr/Zr$_x$O$_y$ | Ion gun | ◯ | ◯ | ◯ |
| Example 14 | ITO | Ta/Ta$_x$O$_y$ | Ion gun | ◯ | ◯ | ◯ |
| Example 15 | ITO | Si/Si$_x$O$_y$ | Ion gun | ◯ | ◯ | ◯ |

◯: No scratch seen, Δ: Scratches partially seen, X: Scratches seen over entire slid portion In Table 3 above, Zr$_x$O$_y$ (x and y are actual numbers) is a zirconium oxide such as $ZrO_2$ or the like, Ta$_x$O$_y$ (x and y are actual numbers) is a tantalum oxide such as $Ta_2O_5$ or the like, and Si$_x$O$_y$ (x and y are actual numbers) is a silicon oxide such as $SiO_2$ or the like.

It was confirmed from FIGS. 13 to 16 that island-shaped protective bodies were formed on the surface. In addition, it is seen that the results of the sliding characteristics tests are good, and the abrasion resistances of the protective bodies were high, even if the metallic material is replaced by Zr, Ta or Si.

What is claimed is:

1. A touch panel in which first and second panels have first and second substrates and first and second transparent electrodes respectively disposed on the corresponding first and second substrates, the first and second panels being separately arranged in a state such that faces having the first and second transparent electrodes disposed thereon are facing toward each other, and the first and second transparent electrodes are brought into contact when either one or both of the first and second panels are pressed, wherein the first transparent electrode comprises a transparent conductive film and protective bodies which are formed in a piled-up manner on a surface of the transparent conductive film and scattered in a form of islands on the surface of the transparent conductive film, wherein a protecting film, containing at least one of a nitride of a metallic material and an oxide of the metallic material, is exposed on surfaces of the protective bodies.

2. The touch panel according to claim 1, wherein the metallic material comprises at least one kind of metal selected from a metal group consisting of Ti, Nb, Zr, Ta and Si, and the transparent conductive film has a lower resistance than the protecting film.

3. The touch panel according to claim 1, wherein the first substrate is a resin film.

4. The touch panel according to claim 1, wherein the second substrate is a resin film.

5. The touch panel according to claim 1, wherein a diameter of the protective body is at least 3 nm and at most 100 nm.

6. The touch panel according to claim 1, wherein a film thickness of the protective body is less than 2.5 nm.

* * * * *